(12) United States Patent
Takegami et al.

(10) Patent No.: US 12,031,752 B2
(45) Date of Patent: Jul. 9, 2024

(54) REFRIGERATION APPARATUS

(71) Applicant: DAIKIN INDUSTRIES, LTD., Osaka (JP)

(72) Inventors: Masaaki Takegami, Osaka (JP); Shuichi Taguchi, Osaka (JP); Yoshikazu Uehara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 318 days.

(21) Appl. No.: 17/557,713

(22) Filed: Dec. 21, 2021

(65) Prior Publication Data

US 2022/0113064 A1   Apr. 14, 2022

Related U.S. Application Data

(63) Continuation of application No. PCT/JP2020/025267, filed on Jun. 26, 2020.

(30) Foreign Application Priority Data

Jun. 28, 2019  (JP) ................... 2019-120962

(51) Int. Cl.
   *F25B 1/10*        (2006.01)
(52) U.S. Cl.
   CPC .......... *F25B 1/10* (2013.01); *F25B 2309/061* (2013.01); *F25B 2400/13* (2013.01)
(58) Field of Classification Search
   CPC .. F25B 1/10; F25B 41/40; F25B 13/00; F25B 39/00; F25B 41/31; F25B 43/00;
   (Continued)

(56) References Cited

U.S. PATENT DOCUMENTS

| 8,375,741 | B2 | 2/2013 | Taras et al. |
| 2007/0169366 | A1 | 7/2007 | Tadano |
| 2007/0214811 | A1* | 9/2007 | Baruschke ............. B60H 1/322 |
| | | | 62/115 |

(Continued)

FOREIGN PATENT DOCUMENTS

| CN | 101012618 A | 8/2007 |
| CN | 101566769 A | 10/2009 |

(Continued)

OTHER PUBLICATIONS

Pdf is translation of foreign reference JP 2012141131 A (Year: 2012).*

(Continued)

*Primary Examiner* — Henry T Crenshaw
*Assistant Examiner* — Kamran Tavakoldavani
(74) *Attorney, Agent, or Firm* — Birch, Stewart, Kolasch & Birch, LLP (57) ABSTRACT

A refrigeration apparatus is of a two-stage compression type for compressing a refrigerant to a supercritical region. The refrigeration apparatus includes a lower stage-side compression unit, a higher stage-side compression unit, an intermediate cooler, a heat source-side heat exchanger, a utilization-side heat exchanger, an economizer circuit, and a control unit. During a first operation in which the heat source-side heat exchanger functions as a radiator and the utilization-side heat exchanger functions as an evaporator, in a case where a discharge temperature which is a temperature of the refrigerant discharged from the higher stage-side compression unit is more than a first temperature, the control unit increases a cooling capacity of the intermediate cooler without increasing a refrigerant flow rate of the economizer circuit on condition that the intermediate cooler does not reach a maximum cooling capacity.

20 Claims, 7 Drawing Sheets

(58) Field of Classification Search
CPC .. F25B 43/006; F25B 49/02; F25B 2309/061; F25B 2313/0233; F25B 2313/02732; F25B 2400/072; F25B 2400/075; F25B 2400/13; F25B 2600/111; F25B 2600/2509; F25B 2700/21152; F25B 41/20; F25B 2400/06; F25B 2400/061; F25D 17/06

See application file for complete search history.

(56) References Cited

U.S. PATENT DOCUMENTS

| | | | | |
|---|---|---|---|---|
| 2007/0268944 | A1* | 11/2007 | Voss | H01S 3/036 372/34 |
| 2010/0058781 | A1 | 3/2010 | Lifson et al. | |
| 2014/0033753 | A1* | 2/2014 | Lu | H05K 7/20827 62/190 |
| 2017/0234582 | A1* | 8/2017 | Hatomura | F25B 41/34 62/160 |
| 2017/0349030 | A1* | 12/2017 | Miura | B60H 1/00764 |

FOREIGN PATENT DOCUMENTS

| | | |
|---|---|---|
| JP | 2007-190256 A | 8/2007 |
| JP | 2009-97847 A | 5/2009 |
| JP | 2012-141131 A | 7/2012 |
| JP | 2012141131 A * | 7/2012 |

OTHER PUBLICATIONS

International Search Report (PCT/ISA/210) issued in PCT/JP2020/025267 mailed on Sep. 15, 2020.

Written Opinion (PCT/ISA/237) issued in PCT/JP2020/025267 mailed on Sep. 15, 2020.

English translation of International Preliminary Report on Patentability and Written Opinion of the International Searching Authority for International Application No. PCT/JP2020/025267, dated Jan. 6, 2022.

Extended European Search Report for European Application No. 20831461.7, dated Jul. 11, 2022.

* cited by examiner

FIG.6 HEATING AND COOLING-FACILITY OPERATION

_US 12,031,752 B2_

REFRIGERATION APPARATUS

CROSS REFERENCE TO RELATED APPLICATIONS

This application is a Continuation of PCT International Application No. PCT/JP2020/025267, filed on Jun. 26, 2020, which claims priority under 35 U.S.C § 119(a) to Japanese Patent Application No. 2019-120962, filed on Jun. 28, 2019. Each of the above applications is hereby expressly incorporated by reference, in its entirety, into the present application.

TECHNICAL FIELD

The present disclosure relates to a refrigeration apparatus.

BACKGROUND ART

For example, Patent Literature 1 discloses a known refrigeration apparatus of a two-stage compression type. The refrigeration apparatus compresses a refrigerant to a supercritical region in carrying out a cooling operation and a heating operation. As disclosed in Patent Literature 1 (see FIG. 26), the refrigeration apparatus includes a lower stage-side compression unit, a higher stage-side compression unit, an intermediate cooler, a heat source-side heat exchanger, a utilization-side heat exchanger, and an economizer circuit. Patent Literature 1 describes that the intermediate cooler and the economizer circuit are used for cooling the refrigerant to be sucked into the higher stage-side compression unit.

CITATION LIST

Patent Literature

Patent Literature 1: JP 2009-097847 A

SUMMARY

A first aspect of the present disclosure is directed to a refrigeration apparatus (1) of a two-stage compression type for compressing a refrigerant to a supercritical region. The refrigeration apparatus (1) includes: a lower stage-side compression unit (22, 23); a higher stage-side compression unit (21); an intermediate cooler (17) configured to cool the refrigerant discharged from the lower stage-side compression unit (22, 23) and to supply the refrigerant thus cooled to the higher stage-side compression unit (21); a heat source-side heat exchanger (13); a utilization-side heat exchanger (64); an economizer circuit (38) configured to decompress and evaporate a part of the refrigerant flowed out of the heat source-side heat exchanger (13) or utilization-side heat exchanger (64) functioning as a radiator and to supply the refrigerant thus decompressed and evaporated to the higher stage-side compression unit (21); and a control unit (100) configured to control a cooling capacity of the intermediate cooler (17) and a refrigerant flow rate (Q) of the economizer circuit (38). During a first operation in which the heat source-side heat exchanger (13) functions as a radiator and the utilization-side heat exchanger (64) functions as an evaporator, in a case where a discharge temperature (Td) which is a temperature of the refrigerant discharged from the higher stage-side compression unit (21) is more than a first temperature, the control unit (100) increases the cooling capacity of the intermediate cooler (17) without increasing the refrigerant flow rate (Q) of the economizer circuit (38) on condition that the intermediate cooler (17) does not reach a maximum cooling capacity.

DESCRIPTION OF EMBODIMENTS

Embodiments will be described below with reference to the drawings. The following embodiments are preferable examples in nature, and are not intended to limit the scope of the present invention, products to which the present invention is applied, or the use of the present invention.

<General Configuration>

A refrigeration apparatus (1) according to an embodiment is configured to cool a cooling target and condition indoor air at the same time. The term "cooling target" as used herein may involve air in a facility such as a refrigerator, a freezer, or a showcase. In the following description, such a cooling target facility is referred to as a cooling facility.

Figure 1:
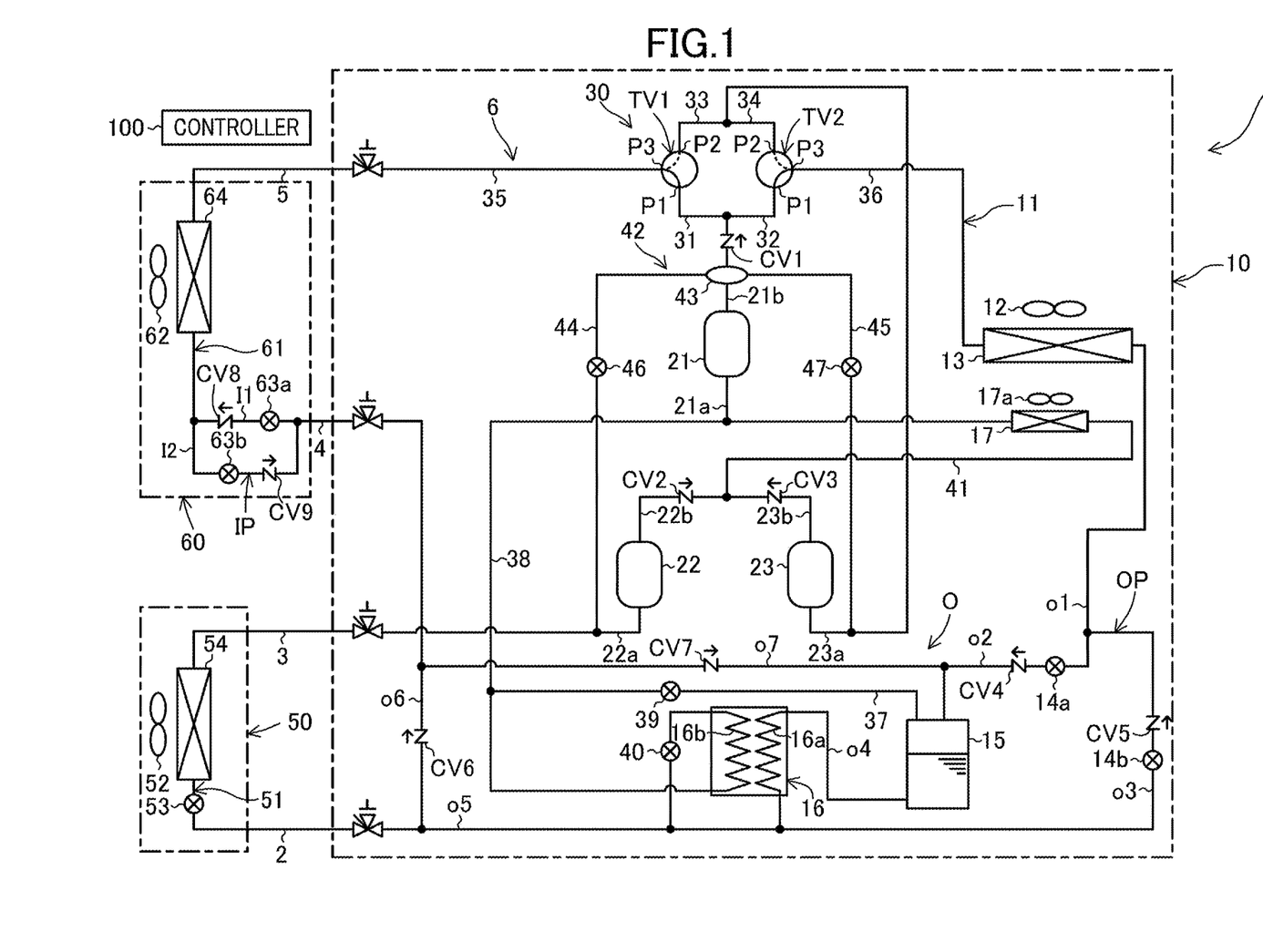
FIG. 1 is a diagram of a piping system in a refrigeration apparatus according to an embodiment.

As illustrated in FIG. 1, the refrigeration apparatus (1) includes an outdoor unit (10) installed outdoors, a cooling facility unit (50) configured to cool inside air, an indoor unit (60) configured to condition indoor air, and a controller (100). The refrigeration apparatus (1) does not necessarily include one cooling facility unit (50) and one indoor unit (60). For example, the refrigeration apparatus (1) may include two or more cooling facility units (50) and two or more indoor units (60). These units (10, 50, 60) are connected via four connection pipes (2, 3, 4, 5) to constitute a refrigerant circuit (6).

The four connection pipes (2, 3, 4, 5) include a first liquid connection pipe (2), a first gas connection pipe (3), a second liquid connection pipe (4), and a second gas connection pipe (5). The first liquid connection pipe (2) and the first gas connection pipe (3) are provided for the cooling facility unit (50). The second liquid connection pipe (4) and the second gas connection pipe (5) are provided for the indoor unit (60).

A refrigeration cycle is achieved in such a manner that a refrigerant circulates through the refrigerant circuit (6). In this embodiment, the refrigerant in the refrigerant circuit (6) is carbon dioxide. The refrigerant circuit (6) is configured to perform a refrigeration cycle in which a pressure above a critical pressure is applied to a refrigerant.

<Outdoor Unit>

The outdoor unit (10) is a heat source unit to be installed outdoors. The outdoor unit (10) includes an outdoor fan (12) and an outdoor circuit (11). The outdoor circuit (11) includes a first compressor (21), a second compressor (22), a third compressor (23), a switching unit (30), an outdoor heat exchanger (13), a first outdoor expansion valve (14a), a second outdoor expansion valve (14*b*), a receiver (15), a cooling heat exchanger (16), and an intermediate cooler (17). The outdoor heat exchanger (13) serves as a heat source-side heat exchanger.

<Compressors>

Each of the first compressor (21), the second compressor (22), and the third compressor (23) is configured to compress the refrigerant. The first compressor (21) and the second compressor (22) are connected in series. The first compressor (21) and the third compressor (23) are connected in series. The second compressor (22) and the third compressor (23) are connected in parallel. Each of the first compressor (21), the second compressor (22), and the third compressor (23) is a rotary compressor that includes a compression mechanism to be driven by a motor. Each of the first compressor (21), the second compressor (22), and the third compressor (23) is of a variable capacity type, and the operating frequency of each compressor (i.e., the number of rotations of each motor) is adjustable. The first compressor (21) constitutes a higher stage-side compression unit. The second compressor (22) and the third compressor (23) constitute a lower stage-side compression unit.

A first suction pipe (21*a*) and a first discharge pipe (21*b*) are connected to the first compressor (21). A second suction pipe (22*a*) and a second discharge pipe (22*b*) are connected to the second compressor (22). A third suction pipe (23*a*) and a third discharge pipe (23*b*) are connected to the third compressor (23).

The second suction pipe (22*a*) communicates with the cooling facility unit (50). The second compressor (22) is a cooling facility-side compressor provided for the cooling facility unit (50). The third suction pipe (23*a*) communicates with the indoor unit (60). The third compressor (23) is an indoor-side compressor provided for the indoor unit (60).

<Switching Unit>

The switching unit (30) is configured to switch a refrigerant flow path. The switching unit (30) includes a first pipe (31), a second pipe (32), a third pipe (33), a fourth pipe (34), a first three-way valve (TV1), and a second three-way valve (TV2). The first pipe (31) has an inlet end connected to the first discharge pipe (21*b*). The second pipe (32) has an inlet end connected to the first discharge pipe (21*b*). Each of the first pipe (31) and the second pipe (32) is a pipe on which a discharge pressure of the first compressor (21) acts. The third pipe (33) has an outlet end connected to the third suction pipe (23*a*) of the third compressor (23). The fourth pipe (34) has an outlet end connected to the third suction pipe (23*a*) of the third compressor (23). Each of the third pipe (33) and the fourth pipe (34) is a pipe on which suction pressures of the second compressor (22) and third compressor (23) act.

The first three-way valve (TV1) has a first port (P1), a second port (P2), and a third port (P3). The first port (P1) of the first three-way valve (TV1) is connected to an outlet end of the first pipe (31) serving as a high-pressure flow path. The second port (P2) of the first three-way valve (TV1) is connected to an inlet end of the third pipe (33) serving as a low-pressure flow path. The third port (P3) of the first three-way valve (TV1) is connected to an indoor gas-side flow path (35).

The second three-way valve (TV2) has a first port (P1), a second port (P2), and a third port (P3). The first port (P1) of the second three-way valve (TV2) is connected to an outlet end of the second pipe (32) serving as a high-pressure flow path. The second port (P2) of the second three-way valve (TV2) is connected to an inlet end of the fourth pipe (34) serving as a low-pressure flow path. The third port (P3) of the second three-way valve (TV2) is connected to an outdoor gas-side flow path (36).

Each of the first three-way valve (TV1) and the second three-way valve (TV2) is a rotary-type electrically driven three-way valve. Each three-way valve (TV1, TV2) is switched to a first state (a state indicated by a solid line in FIG. 1) and a second state (a state indicated by a broken line in FIG. 1). In each three-way valve (TV1, TV2) switched to the first state, the first port (P1) and the third port (P3) communicate with each other and the second port (P2) is closed. In each three-way valve (TV1, TV2) switched to the second state, the second port (P2) and the third port (P3) communicate with each other and the first port (P1) is closed.

<Outdoor Heat Exchanger>

The outdoor heat exchanger (13) is a fin-and-tube air heat exchanger. The outdoor fan (12) is disposed near the outdoor heat exchanger (13). The outdoor fan (12) is configured to provide outdoor air. The outdoor heat exchanger (13) causes the refrigerant flowing therethrough to exchange heat with the outdoor air provided by the outdoor fan (12).

The outdoor heat exchanger (13) has a gas end to which the outdoor gas-side flow path (36) is connected. The outdoor heat exchanger (13) has a liquid end to which an outdoor flow path (0) is connected.

<Outdoor Flow Path>

The outdoor flow path (0) includes an outdoor first pipe (o1), an outdoor second pipe (o2), an outdoor third pipe (o3), an outdoor fourth pipe (o4), an outdoor fifth pipe (o5), an outdoor sixth pipe (o6), and an outdoor seventh pipe (o7). The outdoor first pipe (o1) has a first end connected to the liquid end of the outdoor heat exchanger (13). The outdoor first pipe (o1) has a second end to which a first end of the outdoor second pipe (o2) and a first end of the outdoor third pipe (o3) are connected. The outdoor second pipe (o2) has a second end connected to a top portion of the receiver (15). The outdoor fourth pipe (o4) has a first end connected to a bottom portion of the receiver (15). The outdoor fourth pipe (o4) has a second end to which a first end of the outdoor fifth pipe (o5) and a second end of the outdoor third pipe (o3) are connected. The outdoor fifth pipe (o5) has a second end connected to the first liquid connection pipe (2). The outdoor sixth pipe (o6) has a first end connected to a point between the two ends of the outdoor fifth pipe (o5). The outdoor sixth pipe (o6) has a second end connected to the second liquid connection pipe (4). The outdoor seventh pipe (o7) has a first end connected to a point between the two ends of the outdoor sixth pipe (o6). The outdoor seventh pipe (o7) has a second end connected to a point between the two ends of the outdoor second pipe (o2).

The outdoor second pipe (o2) and the outdoor third pipe (o3) are connected in parallel to constitute an outdoor parallel circuit (OP).

<Outdoor Expansion Valve>

The first outdoor expansion valve (14*a*) is connected to the outdoor second pipe (o2). The second outdoor expansion valve (14*b*) is connected to the outdoor third pipe (o3). Each outdoor expansion valve (14*a*, 14*b*) is a decompression mechanism configured to decompress the refrigerant. Each outdoor expansion valve (14*a*, 14*b*) is a heat source-side expansion valve. Each outdoor expansion valve (14*a*, 14*b*) is an opening degree-changeable electronic expansion valve.

<Receiver>

The receiver (15) serves as a container configured to store the refrigerant. The receiver (15) separates the refrigerant into the gas refrigerant and the liquid refrigerant. The receiver (15) has the top portion to which the second end of the outdoor second pipe (o2) and a first end of a degassing pipe (37) are connected. The degassing pipe (37) has a second end connected to a point between two ends of an injection pipe (38). A degassing valve (39) is connected to the degassing pipe (37). The degassing valve (39) is an opening degree-changeable electronic expansion valve.

<Cooling Heat Exchanger>

The cooling heat exchanger (16) is configured to cool the refrigerant (mainly the liquid refrigerant) separated by the receiver (15). The cooling heat exchanger (16) includes a first refrigerant flow path (16a) and a second refrigerant flow path (16b). The first refrigerant flow path (16a) is connected to a point between the two ends of the outdoor fourth pipe (o4). The second refrigerant flow path (16b) is connected to a point between the two ends of the injection pipe (38).

The injection pipe (38) has a first end connected to a point between the two ends of the outdoor fifth pipe (o5). The injection pipe (38) has a second end connected to the first suction pipe (21a) of the first compressor (21). The injection pipe (38) is provided with a reducing valve (40) located upstream of the second refrigerant flow path (16b). The reducing valve (40) is an opening degree-changeable electronic expansion valve. The injection pipe (38) constitutes an economizer circuit.

The cooling heat exchanger (16) causes the refrigerant flowing through the first refrigerant flow path (16a) to exchange heat with the refrigerant flowing through the second refrigerant flow path (16b). The refrigerant decompressed by the reducing valve (40) flows through the second refrigerant flow path (16b). Therefore, the cooling heat exchanger (16) cools the refrigerant flowing through the first refrigerant flow path (16a) and evaporates the refrigerant flowing through the second refrigerant flow path (16b).

<Intermediate Cooler>

The intermediate cooler (17) is connected to an intermediate flow path (41). The intermediate flow path (41) has a first end connected to the second discharge pipe (22b) of the second compressor (22) and the third discharge pipe (23b) of the third compressor (23). The intermediate flow path (41) has a second end connected to the first suction pipe (21a) of the first compressor (21).

The intermediate cooler (17) is a fin-and-tube air heat exchanger. A cooling fan (17a) is disposed near the intermediate cooler (17). The cooling fan (17a) is configured to provide outdoor air. The intermediate cooler (17) causes the refrigerant flowing therethrough to exchange heat with outdoor air provided by the cooling fan (17a), thereby cooling the refrigerant.

<Oil Separation Circuit>

The outdoor circuit (11) includes an oil separation circuit (42). The oil separation circuit (42) includes an oil separator (43), a first oil return pipe (44), and a second oil return pipe (45). The oil separator (43) is connected to the first discharge pipe (21b) of the first compressor (21). The oil separator (43) is configured to separate oil from the refrigerant discharged from the first compressor (21). The first oil return pipe (44) has an inlet end connected to the oil separator (43). The first oil return pipe (44) has an outlet end connected to the second suction pipe (22a) of the second compressor (22). The second oil return pipe (45) has an inlet end connected to the oil separator (43). The second oil return pipe (45) has an outlet end connected to the third suction pipe (23a) of the third compressor (23). A first oil regulation valve (46) is connected to the first oil return pipe (44). A second oil regulation valve (47) is connected to the second oil return pipe (45).

The oil separated by the oil separator (43) is returned to the second compressor (22) via the first oil return pipe (44). The oil separated by the oil separator (43) is returned to the third compressor (23) via the second oil return pipe (45). The oil separated by the oil separator (43) may be directly returned to an oil reservoir in a casing of the second compressor (22). The oil separated by the oil separator (43) may be directly returned to an oil reservoir in a casing of the third compressor (23).

<Cooling Facility Unit>

The cooling facility unit (50) is installed in, for example, a cold storage warehouse. The cooling facility unit (50) includes an inside fan (52) and a cooling facility circuit (51). The cooling facility circuit (51) has a liquid end to which the first liquid connection pipe (2) is connected. The cooling facility circuit (51) has a gas end to which the first gas connection pipe (3) is connected.

The cooling facility circuit (51) includes a cooling facility expansion valve (53) and a cooling facility heat exchanger (54) arranged in this order from the liquid end toward the gas end. The cooling facility expansion valve (53) is a utilization-side expansion valve. The cooling facility expansion valve (53) is an opening degree-changeable electronic expansion valve.

The cooling facility heat exchanger (54) is a fin-and-tube air heat exchanger. The inside fan (52) is disposed near the cooling facility heat exchanger (54). The inside fan (52) is configured to provide inside air. The cooling facility heat exchanger (54) causes the refrigerant flowing therethrough to exchange heat with the inside air provided by the inside fan (52).

<Indoor Unit>

The indoor unit (60) is a utilization unit to be installed indoors. The indoor unit (60) includes an indoor fan (62) and an indoor circuit (61). The indoor circuit (61) has a liquid end to which the second liquid connection pipe (4) is connected. The indoor circuit (61) has a gas end to which the second gas connection pipe (5) is connected.

The indoor circuit (61) includes an indoor parallel circuit (IP) and an indoor heat exchanger (64) arranged in this order from the liquid end toward the gas end. The indoor parallel circuit (IP) includes an indoor first pipe (I1), an indoor second pipe (I2), a first indoor expansion valve (63a), and a second indoor expansion valve (63b). The indoor heat exchanger (64) serves as a utilization-side heat exchanger.

The first indoor expansion valve (63a) is connected to the indoor first pipe (I1). The second indoor expansion valve (63b) is connected to the indoor second pipe (I2). Each indoor expansion valve (63a, 63b) is a utilization-side expansion valve. Each indoor expansion valve (63a, 63b) is an opening degree-changeable electronic expansion valve.

The indoor heat exchanger (64) is a fin-and-tube air heat exchanger. The indoor fan (62) is disposed near the indoor heat exchanger (64). The indoor fan (62) is configured to provide indoor air. The indoor heat exchanger (64) causes the refrigerant flowing therethrough to exchange heat with the indoor air provided by the indoor fan (62).

<Check Valve>

The outdoor circuit (11) includes a first check valve (CV1), a second check valve (CV2), a third check valve (CV3), a fourth check valve (CV4), a fifth check valve (CV5), a sixth check valve (CV6), and a seventh check valve (CV7). The first check valve (CV1) is connected to the first discharge pipe (21b). The second check valve (CV2) is connected to the second discharge pipe (22b). The third check valve (CV3) is connected to the third discharge pipe (23b). The fourth check valve (CV4) is connected to the outdoor second pipe (o2). The fifth check valve (CV5) is connected to the outdoor third pipe (o3). The sixth check valve (CV6) is connected to the outdoor sixth pipe (o6). The seventh check valve (CV7) is connected to the outdoor seventh pipe (o7).

The indoor circuit (61) includes an eighth check valve (CV8) and a ninth check valve (CV9). The eighth check valve (CV8) is connected to the indoor first pipe (I1). The ninth check valve (CV9) is connected to the indoor second pipe (I2).

These check valves (CV1 to CV9) each permit the flow of the refrigerant in a direction indicated by an arrow in FIG. 1 and prohibit the flow of the refrigerant in the opposite direction to the direction indicated by the arrow in FIG. 1.

<Sensors>

The refrigeration apparatus (1) includes various sensors (not illustrated). These sensors are configured to detect indices such as a temperature and a pressure of the high-pressure refrigerant in the refrigerant circuit (6), a temperature and a pressure of the low-pressure refrigerant in the refrigerant circuit (6), a temperature and a pressure of the intermediate-pressure refrigerant in the refrigerant circuit (6), a temperature of the refrigerant in the outdoor heat exchanger (13), a temperature of the refrigerant in the cooling facility heat exchanger (54), a temperature of the refrigerant in the indoor heat exchanger (64), a degree of superheating of the refrigerant sucked in the second compressor (22), a degree of superheating of the refrigerant sucked in the third compressor (23), a degree of superheating of the refrigerant discharged from each of the first to third compressors (21 to 23), a temperature of the outdoor air, a temperature of the inside air, and a temperature of the indoor air.

<Controller>

The controller (100) includes a microcomputer mounted on a control board, and a memory device (specifically, a semiconductor memory) storing software for operating the microcomputer. The controller (100) is configured to control the respective components of the refrigeration apparatus (1), based on an operation command and a detection signal from a sensor. The controller (100) controls the respective components, thereby changing an operation of the refrigeration apparatus (1). The controller (100) constitutes a control unit.

—Operations—

Next, a description will be given of operations to be carried out by the refrigeration apparatus (1). The operations to be carried out by the refrigeration apparatus (1) include, for example, a cooling operation, a cooling and cooling-facility operation, a heating operation, and a heating and cooling-facility operation. Each of the cooling operation and the cooling and cooling-facility operation is an example of a first operation. Each of the heating operation and the heating and cooling-facility operation is an example of a second operation. It should be noted however that the operations to be carried out by the refrigeration apparatus (1) are not limited to those described herein.

During the cooling operation, the cooling facility unit (50) stops, while the indoor unit (60) cools the indoor air. During the cooling and cooling-facility operation, the cooling facility unit (50) operates, while the indoor unit (60) cools the indoor air. During the heating operation, the cooling facility unit (50) stops, while the indoor unit (60) heats the indoor air. During the heating and cooling-facility operation, the cooling facility unit (50) operates, while the indoor unit (60) heats the indoor air.

<Cooling Operation>

Figure 2:
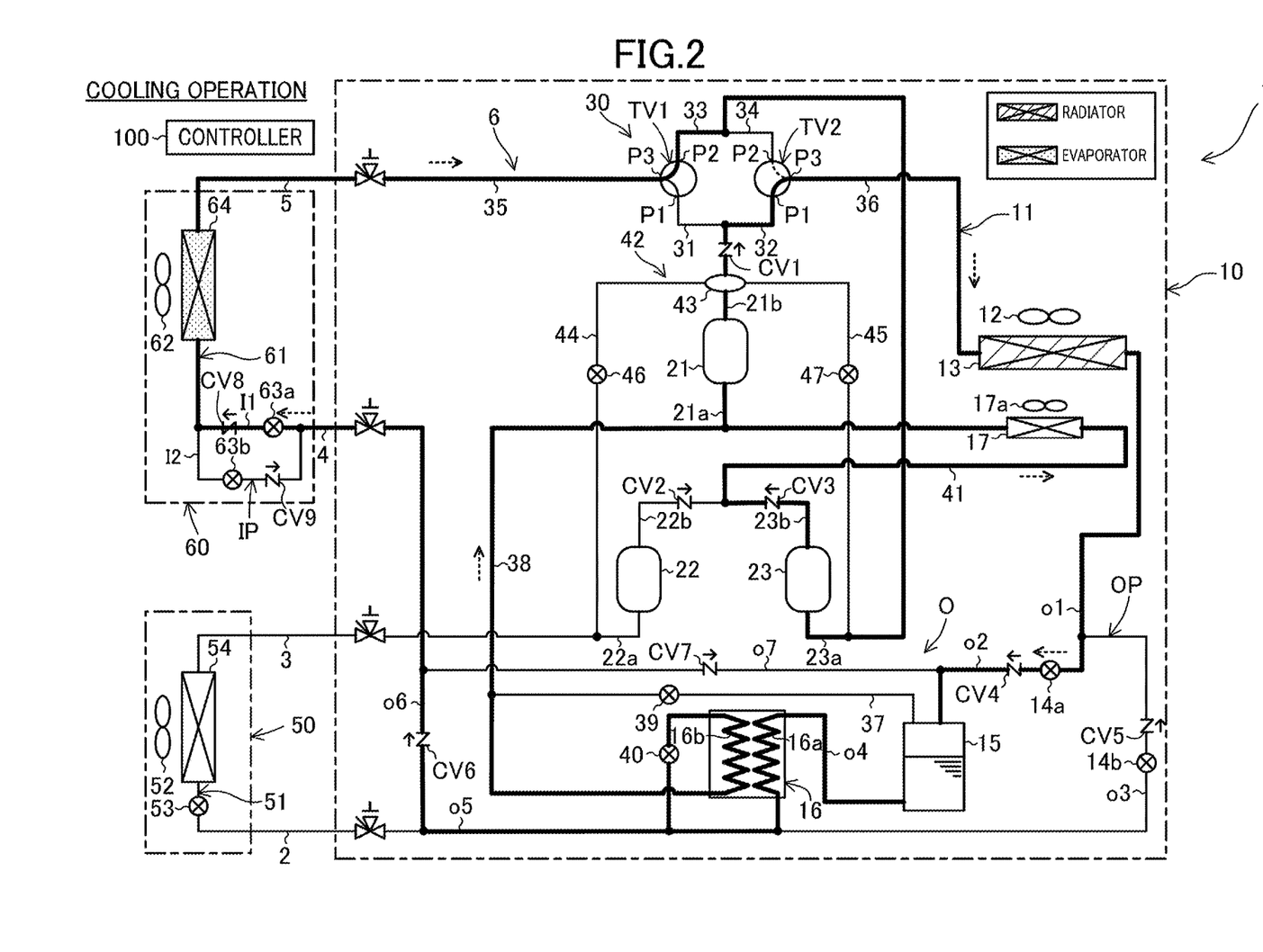
FIG. 2 is a diagram (equivalent to FIG. 1) of a flow of a refrigerant during a cooling operation.

During the cooling operation illustrated in FIG. 2, the first three-way valve (TV1) is in the second state, while the second three-way valve (TV2) is in the first state. The first outdoor expansion valve (14a) is opened at a predetermined opening degree. The cooling facility expansion valve (53) is fully closed. The opening degree of the first indoor expansion valve (63a) is adjusted by superheating control. The opening degree of the reducing valve (40) is appropriately adjusted. The outdoor fan (12) and the indoor fan (62) operate, while the inside fan (52) stops. The first compressor (21) and the third compressor (23) operate, while the second compressor (22) stops. During the cooling operation, a refrigeration cycle is achieved, in which each of the first compressor (21) and the third compressor (23) compresses the refrigerant, the outdoor heat exchanger (13) causes the refrigerant to dissipate heat, and the indoor heat exchanger (64) evaporates the refrigerant. In other words, during the cooling operation, the outdoor heat exchanger (13) functions as a radiator and the indoor heat exchanger (64) functions as an evaporator.

As illustrated in FIG. 2, the third compressor (23) compresses the refrigerant, the intermediate cooler (17) cools the refrigerant, and the first compressor (21) sucks in the refrigerant. After the first compressor (21) compresses the refrigerant to a supercritical region, the outdoor heat exchanger (13) causes the refrigerant to dissipate heat.

After the outdoor heat exchanger (13) causes the refrigerant to dissipate heat, the resultant refrigerant flows into the outdoor second pipe (o2). In the outdoor second pipe (o2), the high-pressure refrigerant passes the first outdoor expansion valve (14a) in the open state. Thereafter, the high-pressure refrigerant passes the fourth check valve (CV4).

The refrigerant then flows through the receiver (15). The cooling heat exchanger (16) then cools the refrigerant. After the cooling heat exchanger (16) cools the refrigerant, the refrigerant flows into the indoor first pipe (I1). In the indoor first pipe (I1), the first indoor expansion valve (63a) decompresses the high-pressure refrigerant. The refrigerant thus decompressed passes the eighth check valve (CV8).

The indoor heat exchanger (64) then evaporates the refrigerant. The indoor air is thus cooled. After the indoor heat exchanger (64) evaporates the refrigerant, the third compressor (23) sucks in the refrigerant to compress the refrigerant again.

<Cooling and Cooling-Facility Operation>

Figure 3:
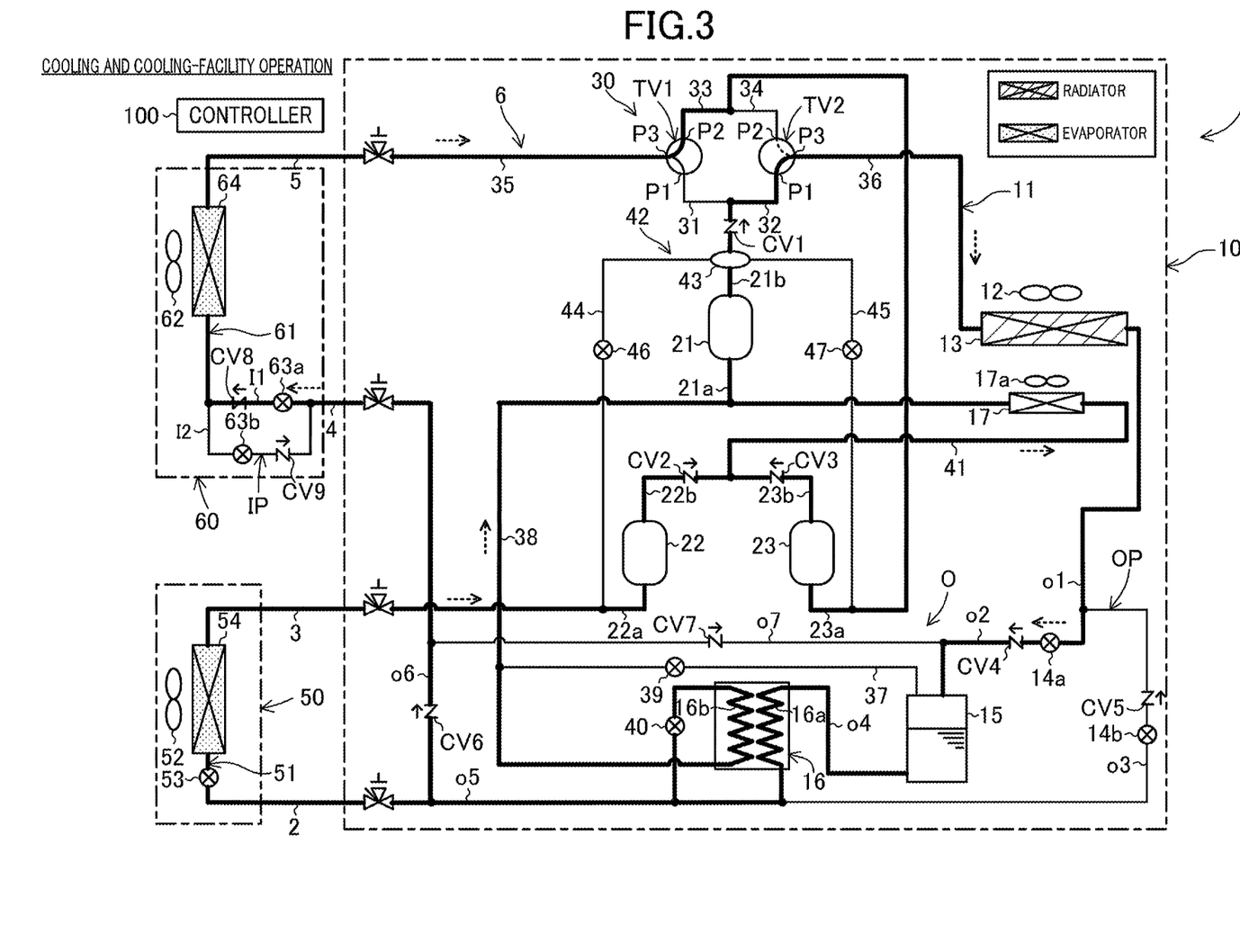
FIG. 3 is a diagram (equivalent to FIG. 1) of a flow of the refrigerant during a cooling and cooling-facility operation.

During the cooling and cooling-facility operation illustrated in FIG. 3, the first three-way valve (TV1) is in the second state, while the second three-way valve (TV2) is in the first state. The first outdoor expansion valve (14a) is opened at a predetermined opening degree. The opening degree of each of the cooling facility expansion valve (53) and the first indoor expansion valve (63a) is adjusted by superheating control. The opening degree of the reducing valve (40) is appropriately adjusted. The outdoor fan (12), the inside fan (52), and the indoor fan (62) operate. The first compressor (21), the second compressor (22), and the third compressor (23) operate. During the cooling and cooling-facility operation, a refrigeration cycle is achieved, in which each of the first to third compressors (21 to 23) compresses the refrigerant, the outdoor heat exchanger (13) causes the refrigerant to dissipate heat, and each of the cooling facility heat exchanger (54) and the indoor heat exchanger (64) evaporates the refrigerant. In other words, during the cooling and cooling-facility operation, the outdoor heat exchanger (13) functions as a radiator and each of the cooling facility heat exchanger (54) and the indoor heat exchanger (64) functions as an evaporator.

As illustrated in FIG. 3, each of the second compressor (22) and the third compressor (23) compresses the refrigerant, the intermediate cooler (17) cools the refrigerant, and the first compressor (21) sucks in the refrigerant. After the first compressor (21) compresses the refrigerant to a supercritical region, the outdoor heat exchanger (13) causes the refrigerant to dissipate heat.

After the outdoor heat exchanger (13) causes the refrigerant to dissipate heat, the resultant refrigerant flows into the outdoor second pipe (o2). In the outdoor second pipe (o2), the high-pressure refrigerant passes the first outdoor expansion valve (14a) in the open state. Thereafter, the high-pressure refrigerant passes the fourth check valve (CV4).

The refrigerant then flows through the receiver (15). The cooling heat exchanger (16) then cools the refrigerant. After the cooling heat exchanger (16) cools the refrigerant, the refrigerant is diverted into the cooling facility unit (50) and the indoor unit (60). The cooling facility expansion valve (53) decompresses the refrigerant, and the cooling facility heat exchanger (54) evaporates the refrigerant. The inside air is thus cooled. After the cooling facility heat exchanger (54) evaporates the refrigerant, the second compressor (22) sucks in the refrigerant to compress the refrigerant again.

When the refrigerant flows into the indoor unit (60), the refrigerant flows through the indoor first pipe (I1). In the indoor first pipe (I1), the first indoor expansion valve (63a) decompresses the high-pressure refrigerant. The refrigerant thus decompressed passes the eighth check valve (CV8).

The indoor heat exchanger (64) then evaporates the refrigerant. The indoor air is thus cooled. After the indoor heat exchanger (64) evaporates the refrigerant, the third compressor (23) sucks in the refrigerant to compress the refrigerant again.

<<Operations of Controller During Cooling Operation or Cooling and Cooling-Facility Operation>>

With reference to a flowchart of FIG. 4, a description will be given of operations of the controller (100) during the cooling operation or the cooling and cooling-facility operation (in other words, during the first operation). In the cooling operation or the cooling and cooling-facility operation, the controller (100) controls the cooling capacity of the intermediate cooler (17) and the refrigerant flow rate (Q) of the injection pipe (38) such that the discharge temperature (Td) which is the temperature of the refrigerant discharged from the first compressor (21) is brought close to a predetermined temperature (e.g., 80° C.). In the cooling operation or the cooling and cooling-facility operation, the controller (100) uses the intermediate cooler (17) prior to the injection pipe (38).

Figure 4:
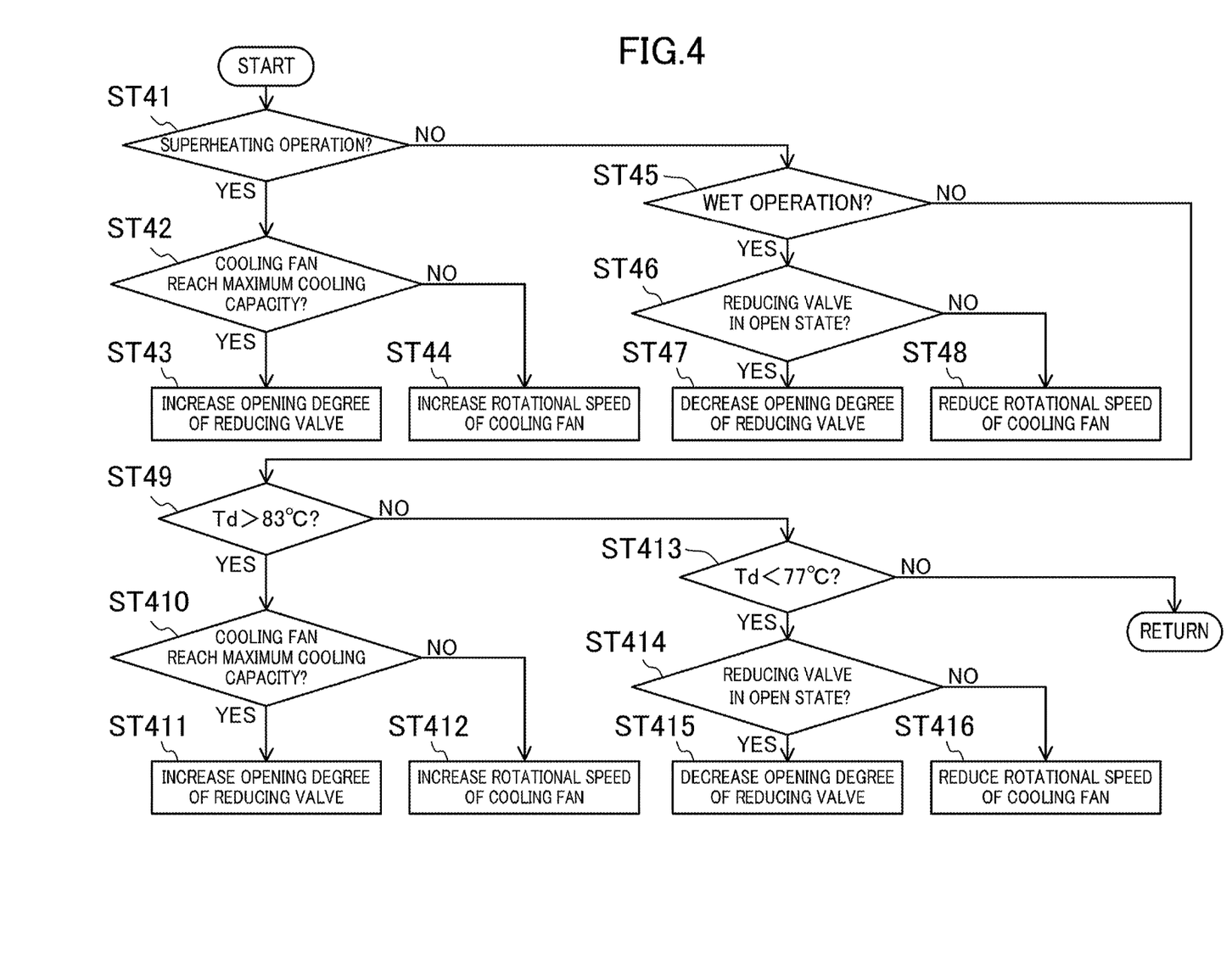
FIG. 4 is a flowchart of operations of a controller during the cooling operation or the cooling and cooling-facility operation.

As illustrated in FIG. 4, in step 41, the controller (100) determines whether the first compressor (21) is in a superheating operation state. Specifically, when the discharge temperature (Td) is not less than 90° C. (which is an example of a first temperature), the controller (100) determines that the first compressor (21) is in the superheating operation state. When the discharge temperature (Td) is less than 90° C., the controller (100) determines that the first compressor (21) is not in the superheating operation state. When the first compressor (21) is in the superheating operation state, the processing proceeds to step 42. When the first compressor (21) is not in the superheating operation state, the processing proceeds to step 45.

In step 42, the controller (100) determines whether the cooling fan (17a) reaches a maximum rotational speed. In this embodiment, the state in which the cooling fan (17a) reaches the maximum rotational speed corresponds to a state in which the intermediate cooler (17) reaches a maximum cooling capacity. When the cooling fan (17a) reaches the maximum rotational speed, the processing proceeds to step 43. When the cooling fan (17a) does not reach the maximum rotational speed, the processing proceeds to step 44.

In step 43, the controller (100) increases the opening degree of the reducing valve (40). This increases the refrigerant flow rate (Q) of the injection pipe (38) and reduces the suction temperature and, thus, the discharge temperature (Td) of the first compressor (21).

In step 44, the controller (100) increases the rotational speed of the cooling fan (17a) without changing the opening degree of the reducing valve (40). This increases the cooling capacity of the intermediate cooler (17) and reduces the suction temperature and, thus, the discharge temperature (Td) of the first compressor (21).

In step 45, the controller (100) determines whether the first compressor (21) is in a wet operation state. Specifically, when the discharge temperature (Td) is not more than 40° C. (which is an example of a second temperature), the controller (100) determines that the first compressor (21) is in the wet operation state. When the discharge temperature (Td) is more than 40° C., the controller (100) determines that the first compressor (21) is not in the wet operation state. When the first compressor (21) is in the wet operation state, the processing proceeds to step 46. When the first compressor (21) is not in the wet operation state, the processing proceeds to step 49.

In step 46, the controller (100) determines whether the reducing valve (40) is in an open state. In this embodiment, the state in which the reducing valve (40) is open corresponds to a state in which the refrigerant flows through the injection pipe (38). When the reducing valve (40) is in the open state, the processing proceeds to step 47. When the reducing valve (40) is not in the open state, the processing proceeds to step 48.

In step 47, the controller (100) decreases the opening degree of the reducing valve (40) without changing the rotational speed of the cooling fan (17a). This reduces the refrigerant flow rate (Q) of the injection pipe (38) and increases the suction temperature and, thus, the discharge temperature (Td) of the first compressor (21).

In step 48, the controller (100) reduces the rotational speed of the cooling fan (17a). This decreases the cooling capacity of the intermediate cooler (17) and increases the suction temperature and, thus, the discharge temperature (Td) of the first compressor (21).

In step 49, the controller (100) determines whether the discharge temperature (Td) of the first compressor (21) is more than 83° C. (which is an example of a third temperature). When the discharge temperature (Td) of the first compressor (21) is more than 83° C., the processing proceeds to step 410. When the discharge temperature (Td) of the first compressor (21) is not more than 83° C., the processing proceeds to step 413.

In step 410, the controller (100) determines whether the cooling fan (17a) reaches the maximum rotational speed. In this embodiment, the state in which the cooling fan (17a) reaches the maximum rotational speed corresponds to the state in which the intermediate cooler (17) reaches the maximum cooling capacity. When the cooling fan (17a) reaches the maximum rotational speed, the processing proceeds to step 411. When the cooling fan (17a) does not reach the maximum rotational speed, the processing proceeds to step 412.

In step 411, the controller (100) increases the opening degree of the reducing valve (40). This increases the refrigerant flow rate (Q) of the injection pipe (38) and reduces the suction temperature and, thus, the discharge temperature (Td) of the first compressor (21).

In step 412, the controller (100) increases the rotational speed of the cooling fan (17a) without changing the opening degree of the reducing valve (40). This increases the cooling capacity of the intermediate cooler (17) and reduces the suction temperature and, thus, the discharge temperature (Td) of the first compressor (21).

In step 413, the controller (100) determines whether the discharge temperature (Td) of the first compressor (21) is less than 77° C. (which is an example of a fourth temperature). When the discharge temperature (Td) of the first compressor (21) is less than 77° C., the processing proceeds to step 414. When the discharge temperature (Td) of the first compressor (21) is not less than 77° C., the processing returns to step 41.

In step 414, the controller (100) determines whether the reducing valve (40) is in the open state. In this embodiment, the state in which the reducing valve (40) is open corresponds to the state in which the refrigerant flows through the injection pipe (38). When the reducing valve (40) is in the open state, the processing proceeds to step 415. When the reducing valve (40) is not in the open state, the processing proceeds to step 416.

In step 415, the controller (100) decreases the opening degree of the reducing valve (40) without changing the rotational speed of the cooling fan (17a). This reduces the refrigerant flow rate (Q) of the injection pipe (38) and increases the suction temperature and, thus, the discharge temperature (Td) of the first compressor (21).

In step 416, the controller (100) reduces the rotational speed of the cooling fan (17a). This decreases the cooling capacity of the intermediate cooler (17) and increases the suction temperature and, thus, the discharge temperature (Td) of the first compressor (21).

<Heating Operation>

Figure 5:
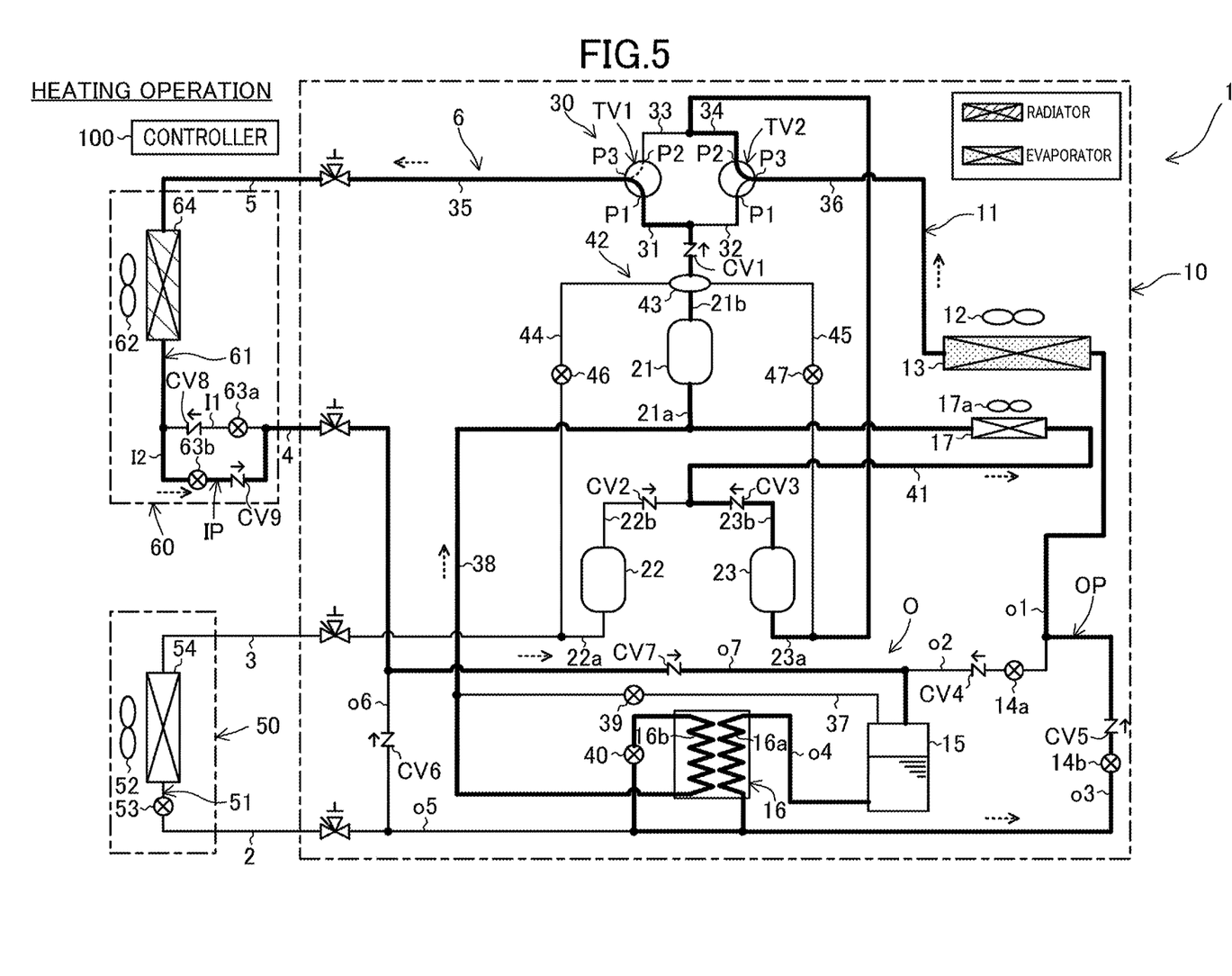
FIG. 5 is a diagram (equivalent to FIG. 1) of a flow of the refrigerant during a heating operation.

During the heating operation illustrated in FIG. 5, the first three-way valve (TV1) is in the first state, while the second three-way valve (TV2) is in the second state. The second indoor expansion valve (63b) is opened at a predetermined opening degree. The cooling facility expansion valve (53) is fully closed. The opening degree of the second outdoor expansion valve (14b) is adjusted by superheating control. The opening degree of the reducing valve (40) is appropriately adjusted. The outdoor fan (12) and the indoor fan (62) operate, while the inside fan (52) stops. The first compressor (21) and the third compressor (23) operate, while the second compressor (22) stops. During the heating operation, a refrigeration cycle is achieved, in which each of the first compressor (21) and the third compressor (23) compresses the refrigerant, the indoor heat exchanger (64) causes the refrigerant to dissipate heat, and the outdoor heat exchanger (13) evaporates the refrigerant. In other words, during the heating operation, the outdoor heat exchanger (13) functions as an evaporator and the indoor heat exchanger (64) functions as a radiator.

As illustrated in FIG. 5, the third compressor (23) compresses the refrigerant, and the first compressor (21) sucks in the refrigerant. After the first compressor (21) compresses the refrigerant to the supercritical region, the indoor heat exchanger (64) causes the refrigerant to dissipate heat. The indoor air is thus heated.

After the indoor heat exchanger (64) causes the refrigerant to dissipate heat, the resultant refrigerant flows into the indoor second pipe (I2). In the indoor second pipe (I2), the high-pressure refrigerant passes the second indoor expansion valve (63b). Thereafter, the high-pressure refrigerant passes the ninth check valve (CV9).

The refrigerant then flows through the receiver (15). The cooling heat exchanger (16) then cools the refrigerant. After the cooling heat exchanger (16) cools the refrigerant, the refrigerant flows into the outdoor third pipe (o3). In the outdoor third pipe (o3), the second outdoor expansion valve (14b) decompresses the high-pressure refrigerant. The refrigerant thus decompressed passes the fifth check valve (CV5).

The outdoor heat exchanger (13) then evaporates the refrigerant. After the outdoor heat exchanger (13) evaporates the refrigerant, the third compressor (23) sucks in the refrigerant to compress the refrigerant again.

<Heating and Cooling-Facility Operation>

Figure 6:
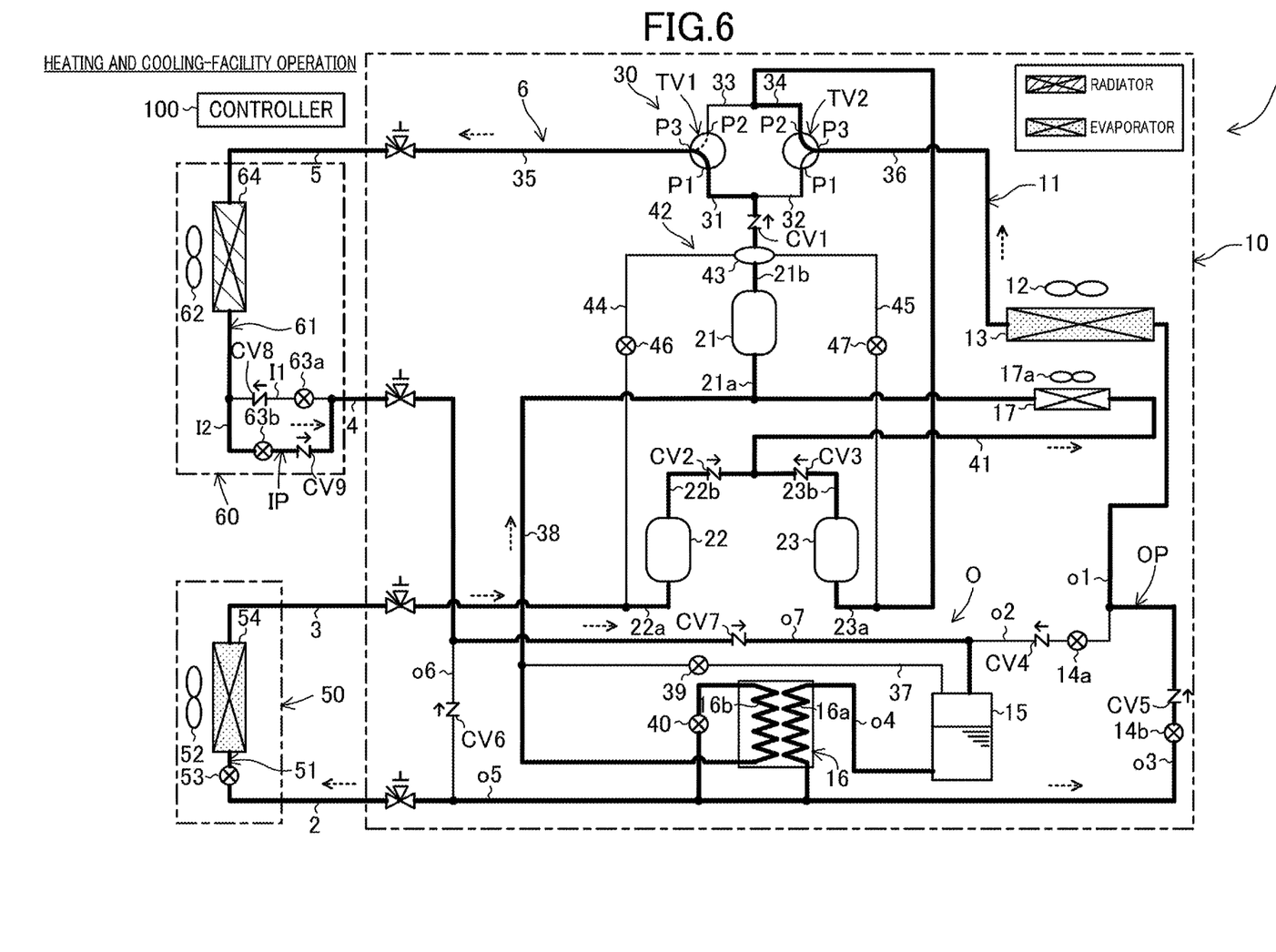
FIG. 6 is a diagram (equivalent to FIG. 1) of a flow of the refrigerant during a heating and cooling-facility operation.

During the heating and cooling-facility operation illustrated in FIG. 6, the first three-way valve (TV1) is in the first state, while the second three-way valve (TV2) is in the second state. The second indoor expansion valve (63b) is opened at a predetermined opening degree. The opening degree of each of the cooling facility expansion valve (53) and the second outdoor expansion valve (14b) is adjusted by superheating control. The opening degree of the reducing valve (40) is appropriately adjusted. The outdoor fan (12), the inside fan (52), and the indoor fan (62) operate. The first compressor (21), the second compressor (22), and the third compressor (23) operate. During the heating and cooling-facility operation, a refrigeration cycle is achieved, in which each of the first to third compressors (21 to 23) compresses the refrigerant, the indoor heat exchanger (64) causes the refrigerant to dissipate heat, and each of the cooling facility heat exchanger (54) and the outdoor heat exchanger (13) evaporates the refrigerant. In other words, during the heating and cooling-facility operation, each of the cooling facility heat exchanger (54) and the outdoor heat exchanger (13) functions as an evaporator and the indoor heat exchanger (64) functions as a radiator.

As illustrated in FIG. 6, each of the second compressor (22) and the third compressor (23) compresses the refrigerant, and the first compressor (21) sucks in the refrigerant. After the first compressor (21) compresses the refrigerant to the supercritical region, the indoor heat exchanger (64) causes the refrigerant to dissipate heat. The indoor air is thus heated.

After the indoor heat exchanger (64) causes the refrigerant to dissipate heat, the resultant refrigerant flows into the indoor second pipe (I2). In the indoor second pipe (I2), the high-pressure refrigerant passes the second indoor expansion valve (63b). Thereafter, the high-pressure refrigerant passes the ninth check valve (CV9).

The refrigerant then flows through the receiver (15). The cooling heat exchanger (16) then cools the refrigerant. After the cooling heat exchanger (16) cools the refrigerant, a part of the refrigerant flows into the outdoor third pipe (o3). In the outdoor third pipe (o3), the second outdoor expansion valve (14b) decompresses the high-pressure refrigerant. The refrigerant thus decompressed passes the fifth check valve (CV5).

The outdoor heat exchanger (13) then evaporates the refrigerant. After the outdoor heat exchanger (13) evaporates the refrigerant, the third compressor (23) sucks in the refrigerant to compress the refrigerant again.

After the cooling heat exchanger (16) cools the refrigerant, the cooling facility expansion valve (53) decompresses the remaining refrigerant, and the cooling facility heat exchanger (54) evaporates the refrigerant. The inside air is thus cooled. After the cooling facility heat exchanger (54) evaporates the refrigerant, the second compressor (22) sucks in the refrigerant to compress the refrigerant again.

<<Operations of Controller During Heating Operation or Heating and Cooling-Facility Operation>>

With reference to a flowchart of FIG. 7, a description will be given of operations of the controller (100) during the heating operation or the heating and cooling-facility operation (in other words, during the second operation). In the heating operation or the heating and cooling-facility operation, the controller (100) controls the cooling capacity of the intermediate cooler (17) and the refrigerant flow rate (Q) of the injection pipe (38) such that the discharge temperature (Td) is brought close to a predetermined temperature (e.g., 80° C.). In the heating operation or the heating and cooling-facility operation, the controller (100) uses the injection pipe (38) prior to the intermediate cooler (17).

Figure 7:
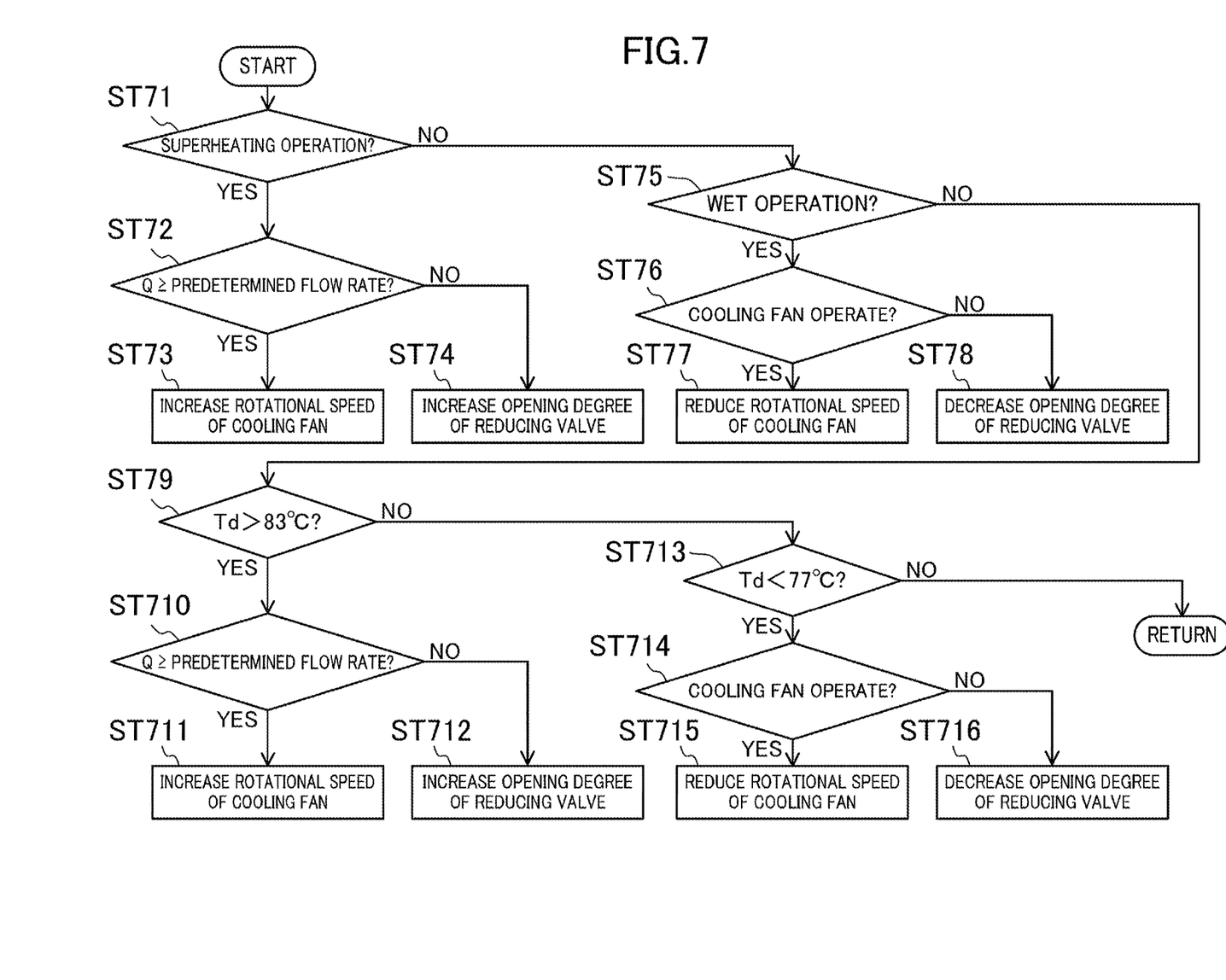
FIG. 7 is a flowchart of operations of the controller during the heating operation or the heating and cooling-facility operation.

As illustrated in FIG. 7, in step 71, the controller (100) determines whether the first compressor (21) is in the superheating operation state. Specifically, when the discharge temperature (Td) is not less than 90° C. (which is an example of the first temperature), the controller (100) determines that the first compressor (21) is in the superheating operation state. When the discharge temperature (Td) is less than 90° C., the controller (100) determines that the first compressor (21) is not in the superheating operation state. When the first compressor (21) is in the superheating operation state, the processing proceeds to step 72. When the first compressor (21) is not in the superheating operation state, the processing proceeds to step 75.

In step 72, the controller (100) determines whether the refrigerant flow rate (Q) of the injection pipe (38) is not less than the predetermined flow rate. In this embodiment, the state in which the refrigerant flow rate (Q) of the injection pipe (38) is not less than the predetermined flow rate corresponds to a state in which the opening degree of the reducing valve (40) is larger than a predetermined opening degree. When the refrigerant flow rate (Q) of the injection pipe (38) is not less than the predetermined flow rate, the processing proceeds to step 73. When the refrigerant flow rate (Q) of the injection pipe (38) is less than the predetermined flow rate, the processing proceeds to step 74.

In step 73, the controller (100) increases the rotational speed of the cooling fan (17a). This increases the cooling capacity of the intermediate cooler (17) and reduces the suction temperature and, thus, the discharge temperature (Td) of the first compressor (21).

In step 74, the controller (100) increases the opening degree of the reducing valve (40) without changing the rotational speed of the cooling fan (17a). This increases the refrigerant flow rate (Q) of the injection pipe (38) and reduces the suction temperature and, thus, the discharge temperature (Td) of the first compressor (21).

In step 75, the controller (100) determines whether the first compressor (21) is in the wet operation state. Specifically, when the discharge temperature (Td) is not more than 40° C. (which is an example of the second temperature), the controller (100) determines that the first compressor (21) is in the wet operation state. When the discharge temperature (Td) is more than 40° C., the controller (100) determines that the first compressor (21) is not in the wet operation state. When the first compressor (21) is in the wet operation state, the processing proceeds to step 76. When the first compressor (21) is not in the wet operation state, the processing proceeds to step 79.

In step 76, the controller (100) determines whether the cooling fan (17a) operates or stops. In this embodiment, the state in which the cooling fan (17a) operates corresponds to a state in which the intermediate cooler (17) is used. The state in which the cooling fan (17a) stops corresponds to a state in which the intermediate cooler (17) is not used. When the cooling fan (17a) operates, the processing proceeds to step 77. When the cooling fan (17a) stops, the processing proceeds to step 78.

In step 77, the controller (100) reduces the rotational speed of the cooling fan (17a) without changing the opening degree of the reducing valve (40). This decreases the cooling capacity of the intermediate cooler (17) and increases the suction temperature and, thus, the discharge temperature (Td) of the first compressor (21).

In step 78, the controller (100) decreases the opening degree of the reducing valve (40). This reduces the refrigerant flow rate (Q) of the injection pipe (38) and increases the suction temperature and, thus, the discharge temperature (Td) of the first compressor (21).

In step 79, the controller (100) determines whether the discharge temperature (Td) of the first compressor (21) is more than 83° C. (which is an example of the third temperature). When the discharge temperature (Td) of the first compressor (21) is more than 83° C., the processing proceeds to step 710. When the discharge temperature (Td) of the first compressor (21) is not more than 83° C., the processing proceeds to step 713.

In step 710, the controller (100) determines whether the refrigerant flow rate (Q) of the injection pipe (38) is not less than a predetermined flow rate. In this embodiment, the state in which the refrigerant flow rate (Q) of the injection pipe (38) is not less than the predetermined flow rate corresponds to the state in which the opening degree of the reducing valve (40) is larger than the predetermined opening degree. When the refrigerant flow rate (Q) of the injection pipe (38) is not less than the predetermined flow rate, the processing proceeds to step 711. When the refrigerant flow rate (Q) of the injection pipe (38) is less than the predetermined flow rate, the processing proceeds to step 712.

In step 711, the controller (100) increases the rotational speed of the cooling fan (17a). This increases the cooling capacity of the intermediate cooler (17) and reduces the suction temperature and, thus, the discharge temperature (Td) of the first compressor (21).

In step 712, the controller (100) increases the opening degree of the reducing valve (40) without changing the rotational speed of the cooling fan (17a). This increases the refrigerant flow rate (Q) of the injection pipe (38) and reduces the suction temperature and, thus, the discharge temperature (Td) of the first compressor (21).

In step 713, the controller (100) determines whether the discharge temperature (Td) of the first compressor (21) is less than 77° C. (which is an example of the fourth temperature). When the discharge temperature (Td) of the first compressor (21) is less than 77° C., the processing proceeds to step 714. When the discharge temperature (Td) of the first compressor (21) is not less than 77° C., the processing returns to step 71.

In step 714, the controller (100) determines whether the cooling fan (17a) operates or stops. In this embodiment, the state in which the cooling fan (17a) operates corresponds to the state in which the intermediate cooler (17) is used. On the other hand, the state in which the cooling fan (17a) stops corresponds to the state in which the intermediate cooler (17) is not used. When the cooling fan (17a) operates, the processing proceeds to step 715. When the cooling fan (17*a*) stops, the processing proceeds to step 716.

In step 715, the controller (100) reduces the rotational speed of the cooling fan (17*a*) without changing the opening degree of the reducing valve (40). This decreases the cooling capacity of the intermediate cooler (17) and increases the suction temperature and, thus, the discharge temperature (Td) of the first compressor (21).

In step 716, the controller (100) decreases the opening degree of the reducing valve (40). This reduces the refrigerant flow rate (Q) of the injection pipe (38) and increases the suction temperature and, thus, the discharge temperature (Td) of the first compressor (21).

Advantageous Effects of Embodiment

This embodiment provides a refrigeration apparatus (1) of a two-stage compression type for compressing a refrigerant to a supercritical region. The refrigeration apparatus (1) includes: a first compressor (21); a second compressor (22); a third compressor (23); an intermediate cooler (17) configured to cool the refrigerant discharged from each of the second compressor (22) and the third compressor (23) and to supply the refrigerant thus cooled to the first compressor (21); an outdoor heat exchanger (13); an indoor heat exchanger (64); an injection pipe (38) configured to decompress and evaporate a part of the refrigerant flowed out of the outdoor heat exchanger (13) or indoor heat exchanger (64) functioning as a radiator and to supply the refrigerant thus decompressed and evaporated to the first compressor (21); and a controller (100) configured to control a cooling capacity of the intermediate cooler (17) and a refrigerant flow rate (Q) of the injection pipe (38). During a first operation in which the outdoor heat exchanger (13) functions as a radiator and the indoor heat exchanger (64) functions as an evaporator, in a case where a discharge temperature (Td) which is a temperature of the refrigerant discharged from the first compressor (21) is more than a first temperature, the controller (100) increases the cooling capacity of the intermediate cooler (17) without increasing the refrigerant flow rate (Q) of the injection pipe (38) on condition that the intermediate cooler (17) does not reach a maximum cooling capacity, and increases the refrigerant flow rate (Q) of the injection pipe (38) on condition that the intermediate cooler (17) reaches the maximum cooling capacity. With this configuration, the second compressor (22) and the third compressor (23) as well as the first compressor (21) compress the low-pressure gas refrigerant to the supercritical region. The discharge temperature (Td) lowers as the cooling capacity of the intermediate cooler (17) increases or as the refrigerant flow rate (Q) of the injection pipe (38) increases. According to this embodiment, during the first operation (e.g., the cooling operation), in the case where the discharge temperature (Td) is more than the first temperature, the controller (100) uses the intermediate cooler (17) prior to the injection pipe (38). Specifically, on condition that the intermediate cooler (17) does not reach the maximum cooling capacity, the control unit (100) increases the cooling capacity of the intermediate cooler (17), thereby reducing the discharge temperature (Td) exceeding the first temperature. On the other hand, on condition that the intermediate cooler (17) reaches the maximum cooling capacity, the controller (100) increases the refrigerant flow rate (Q) of the injection pipe (38), thereby reducing the discharge temperature (Td) exceeding the first temperature. As described above, the controller (100) uses the intermediate cooler (17) prior to the injection pipe (38), which improves operation efficiency in the first operation.

In the refrigeration apparatus (1) according to this embodiment, during the first operation, in a case where the discharge temperature (Td) is less than a second temperature lower than the first temperature, the controller (100) reduces the refrigerant flow rate (Q) of the injection pipe (38) without decreasing the cooling capacity of the intermediate cooler (17) on condition that the refrigerant flows through the injection pipe (38), and decreases the cooling capacity of the intermediate cooler (17) on condition that the refrigerant does not flow through the injection pipe (38). Therefore, during the first operation (e.g., the cooling operation), in the case where the discharge temperature (Td) is less than the second temperature, the controller (100) controls the refrigerant flow rate (Q) of the injection pipe (38) prior to the cooling capacity of the intermediate cooler (17). Specifically, on condition that the refrigerant flows through the injection pipe (38), the controller (100) reduces the refrigerant flow rate (Q) of the injection pipe (38), thereby increasing the discharge temperature (Td) falling below the second temperature. On the other hand, on condition that the refrigerant does not flow through the injection pipe (38), the controller (100) decreases the cooling capacity of the intermediate cooler (17), thereby increasing the discharge temperature (Td) falling below the second temperature. As described above, the controller (100) controls the refrigerant flow rate (Q) of the injection pipe (38) prior to the cooling capacity of the intermediate cooler (17), which improves the operation efficiency in the first operation.

The refrigeration apparatus (1) according to this embodiment further includes a cooling fan (17*a*) configured to provide air to the intermediate cooler (17). The controller (100) adjusts an airflow volume of the cooling fan (17*a*) to control the cooling capacity of the intermediate cooler (17). Therefore, the controller (100) increases the airflow volume of the cooling fan (17*a*), thereby increasing the cooling capacity of the intermediate cooler (17), and reduces the airflow volume of the cooling fan (17*a*), thereby decreasing the cooling capacity of the intermediate cooler (17).

In the refrigeration apparatus (1) according to this embodiment, during a second operation in which the outdoor heat exchanger (13) functions as an evaporator and the indoor heat exchanger (64) functions as a radiator, in a case where the discharge temperature (Td) is more than the first temperature, the controller (100) increases the refrigerant flow rate (Q) of the injection pipe (38) without increasing the cooling capacity of the intermediate cooler (17) on condition that the refrigerant flow rate (Q) of the injection pipe (38) is less than a predetermined flow rate, and increases the cooling capacity of the intermediate cooler (17) on condition that the refrigerant flow rate (Q) of the injection pipe (38) is not less than the predetermined flow rate. Therefore, during the second operation (e.g., the heating operation), in the case where the discharge temperature (Td) is more than the first temperature, the controller (100) uses the injection pipe (38) prior to the intermediate cooler (17). Specifically, on condition that the refrigerant flow rate (Q) of the injection pipe (38) is less than the predetermined flow rate, the controller (100) increases the refrigerant flow rate (Q) of the injection pipe (38), thereby reducing the discharge temperature (Td) exceeding the first temperature. On the other hand, on condition that the refrigerant flow rate (Q) of the injection pipe (38) is not less than the predetermined flow rate, the controller (100) increases the cooling capacity of the intermediate cooler (17), thereby reducing the discharge temperature (Td) exceeding the first temperature. As described above, the controller (100) uses the injection pipe (38) prior to the intermediate cooler (17), which improves operation efficiency in the second operation.

In the refrigeration apparatus (1) according to this embodiment, during the second operation, in a case where the discharge temperature (Td) is less than a second temperature lower than the first temperature, the controller (100) decreases the cooling capacity of the intermediate cooler (17) without reducing the refrigerant flow rate (Q) of the injection pipe (38) on condition that the intermediate cooler (17) is used, and reduces the refrigerant flow rate (Q) of the injection pipe (38) on condition that the intermediate cooler (17) is not used. Therefore, during the second operation (e.g., the heating operation), in the case where the discharge temperature (Td) is less than the second temperature, the controller (100) controls the cooling capacity of the intermediate cooler (17) prior to the refrigerant flow rate (Q) of the injection pipe (38). Specifically, on condition that the intermediate cooler (17) is used, the controller (100) decreases the cooling capacity of the intermediate cooler (17), thereby increasing the discharge temperature (Td) falling below the second temperature. On the other hand, on condition that the intermediate cooler (17) is not used, the controller (100) reduces the refrigerant flow rate (Q) of the injection pipe (38), thereby increasing the discharge temperature (Td) falling below the second temperature. As described above, the controller (100) controls the cooling capacity of the intermediate cooler (17) prior to the refrigerant flow rate (Q) of the injection pipe (38), which improves the operation efficiency in the second operation.

The refrigeration apparatus (1) according to this embodiment further includes a cooling fan (17a) configured to provide air to the intermediate cooler (17). The cooling fan (17a) operates in a state in which the intermediate cooler (17) is used. The cooling fan (17a) stops in a state in which the intermediate cooler (17) is not used. Therefore, on condition that the cooling fan (17a) operates, the intermediate cooler (17) is used. On the other hand, on condition that the cooling fan (17a) stops, the intermediate cooler (17) is not used.

Other Embodiments

The foregoing embodiment may have the following configurations.

In the foregoing embodiment, the specific numerical values of the first to fourth temperatures are merely examples, and the first to fourth temperatures may be set at any values. It should be noted however that a relation of "first temperature>third temperature>fourth temperature>second temperature" is satisfied.

For example, the higher stage-side compression unit or the lower stage-side compression unit may include any number of compressors. In addition, the higher stage-side compression unit and the lower stage-side compression unit may be accommodated in a casing of a common compressor.

While the embodiments and modifications have been described herein above, it is to be appreciated that various changes in form and detail may be made without departing from the spirit and scope presently or hereafter claimed. In addition, the foregoing embodiments and modifications may be appropriately combined or substituted as long as the combination or substitution does not impair the functions of the present disclosure.

INDUSTRIAL APPLICABILITY

As described above, the present disclosure is useful for a refrigeration apparatus.

REFERENCE SIGNS LIST

1: refrigeration apparatus
13: outdoor heat exchanger (heat source-side heat exchanger)
17: intermediate cooler
17a: cooling fan
21: first compressor (higher stage-side compression unit)
22: second compressor (lower stage-side compression unit)
23: third compressor (lower stage-side compression unit)
38: injection pipe (economizer circuit)
64: indoor heat exchanger (utilization-side heat exchanger)
Q: refrigerant flow rate
Td: discharge temperature
100: controller (control unit)

The invention claimed is:

1. A refrigeration apparatus of a two-stage compression type for compressing a refrigerant to a supercritical region, the refrigeration apparatus comprising:
a lower stage-side compression unit;
a higher stage-side compression unit;
an intermediate cooler configured to cool the refrigerant discharged from the lower stage-side compression unit and to supply the refrigerant thus cooled to the higher stage-side compression unit;
a heat source-side heat exchanger;
a utilization-side heat exchanger;
an economizer circuit configured to decompress and evaporate a part of the refrigerant flowed out of the heat source-side heat exchanger or utilization-side heat exchanger functioning as a radiator and to supply the refrigerant thus decompressed and evaporated to the higher stage-side compression unit; and
a controller configured to control a cooling capacity of the intermediate cooler and a refrigerant flow rate of the economizer circuit,
wherein
during a first operation in which the heat source-side heat exchanger functions as the radiator and the utilization-side heat exchanger functions as an evaporator, in a case where a discharge temperature which is a temperature of the refrigerant discharged from the higher stage-side compression unit is more than a first temperature, the controller increases the cooling capacity of the intermediate cooler without increasing the refrigerant flow rate of the economizer circuit on condition that the intermediate cooler does not reach a maximum cooling capacity.

2. The refrigeration apparatus according to claim 1, wherein
during the first operation in which the heat source-side heat exchanger functions as the radiator and the utilization-side heat exchanger functions as the evaporator, in the case where the discharge temperature which is the temperature of the refrigerant discharged from the higher stage-side compression unit is more than the first temperature, the controller increases the refrigerant flow rate of the economizer circuit on condition that the intermediate cooler reaches the maximum cooling capacity.

3. The refrigeration apparatus according to claim 1, wherein
during the first operation, in a case where the discharge temperature is less than a second temperature lower than the first temperature, the controller reduces the refrigerant flow rate of the economizer circuit without decreasing the cooling capacity of the intermediate cooler on condition that the refrigerant flows through the economizer circuit.

4. The refrigeration apparatus according to claim 1, wherein
during the first operation, in a case where the discharge temperature is less than a second temperature lower than the first temperature, the controller decreases the cooling capacity of the intermediate cooler on condition that the refrigerant does not flow through the economizer circuit.

5. The refrigeration apparatus according to claim 1, further comprising:
a cooling fan configured to provide air to the intermediate cooler,
wherein
the controller adjusts an airflow volume of the cooling fan to control the cooling capacity of the intermediate cooler.

6. The refrigeration apparatus according to claim 1, wherein
during a second operation in which the heat source-side heat exchanger functions as the evaporator and the utilization-side heat exchanger functions as the radiator, in the case where the discharge temperature is more than the first temperature, the controller increases the refrigerant flow rate of the economizer circuit without increasing the cooling capacity of the intermediate cooler on condition that the refrigerant flow rate of the economizer circuit is less than a predetermined flow rate.

7. The refrigeration apparatus according to claim 1, wherein
during a second operation in which the heat source-side heat exchanger functions as the evaporator and the utilization-side heat exchanger functions as the radiator, in the case where the discharge temperature is more than the first temperature, the controller increases the cooling capacity of the intermediate cooler on condition that the refrigerant flow rate of the economizer circuit is not less than a predetermined flow rate.

8. The refrigeration apparatus according to claim 6, wherein
during the second operation, in a case where the discharge temperature is less than a second temperature lower than the first temperature, the controller decreases the cooling capacity of the intermediate cooler without reducing the refrigerant flow rate of the economizer circuit on condition that the intermediate cooler is used.

9. The refrigeration apparatus according to claim 6, wherein
during the second operation, in a case where the discharge temperature is less than a second temperature lower than the first temperature, the controller reduces the refrigerant flow rate of the economizer circuit on condition that the intermediate cooler is not used.

10. The refrigeration apparatus according to claim 6, further comprising:
a cooling fan configured to provide air to the intermediate cooler,
wherein
the cooling fan operates in a state in which the intermediate cooler is used, and
the cooling fan stops in a state in which the intermediate cooler is not used.

11. The refrigeration apparatus according to claim 2, wherein
during the first operation, in a case where the discharge temperature is less than a second temperature lower than the first temperature, the controller reduces the refrigerant flow rate of the economizer circuit without decreasing the cooling capacity of the intermediate cooler on condition that the refrigerant flows through the economizer circuit.

12. The refrigeration apparatus according to claim 2, wherein
during the first operation, in a case where the discharge temperature is less than a second temperature lower than the first temperature, the controller decreases the cooling capacity of the intermediate cooler on condition that the refrigerant does not flow through the economizer circuit.

13. The refrigeration apparatus according to claim 3, wherein
during the first operation, in a case where the discharge temperature is less than a second temperature lower than the first temperature, the controller decreases the cooling capacity of the intermediate cooler on condition that the refrigerant does not flow through the economizer circuit.

14. The refrigeration apparatus according to claim 2, further comprising:
a cooling fan configured to provide air to the intermediate cooler,
wherein
the controller adjusts an airflow volume of the cooling fan to control the cooling capacity of the intermediate cooler.

15. The refrigeration apparatus according to claim 3, further comprising:
a cooling fan configured to provide air to the intermediate cooler,
wherein
the controller adjusts an airflow volume of the cooling fan to control the cooling capacity of the intermediate cooler.

16. The refrigeration apparatus according to claim 4, further comprising:
a cooling fan configured to provide air to the intermediate cooler,
wherein
the controller adjusts an airflow volume of the cooling fan to control the cooling capacity of the intermediate cooler.

17. The refrigeration apparatus according to claim 2, wherein
during a second operation in which the heat source-side heat exchanger functions as the evaporator and the utilization-side heat exchanger functions as the radiator, in the case where the discharge temperature is more than the first temperature, the controller increases the refrigerant flow rate of the economizer circuit without increasing the cooling capacity of the intermediate cooler on condition that the refrigerant flow rate of the economizer circuit is less than a predetermined flow rate.

18. The refrigeration apparatus according to claim 3, wherein
during a second operation in which the heat source-side heat exchanger functions as the evaporator and the utilization-side heat exchanger functions as the radiator, in the case where the discharge temperature is more than the first temperature, the controller increases the refrigerant flow rate of the economizer circuit without increasing the cooling capacity of the intermediate cooler on condition that the refrigerant flow rate of the economizer circuit is less than a predetermined flow rate.

19. The refrigeration apparatus according to claim 4, wherein
during a second operation in which the heat source-side heat exchanger functions as the evaporator and the utilization-side heat exchanger functions as the radiator, in the case where the discharge temperature is more than the first temperature, the controller increases the refrigerant flow rate of the economizer circuit without increasing the cooling capacity of the intermediate cooler on condition that the refrigerant flow rate of the economizer circuit is less than a predetermined flow rate.

20. The refrigeration apparatus according to claim 5, wherein
during a second operation in which the heat source-side heat exchanger functions as the evaporator and the utilization-side heat exchanger functions as the radiator, in the case where the discharge temperature is more than the first temperature, the controller increases the refrigerant flow rate of the economizer circuit without increasing the cooling capacity of the intermediate cooler on condition that the refrigerant flow rate of the economizer circuit is less than a predetermined flow rate.

* * * * *